Mar. 27, 1923.
A. HAMEL
1,450,036
HEADLIGHT CONTROL FOR USE ON AUTOMOBILES
Filed Jan. 6, 1922
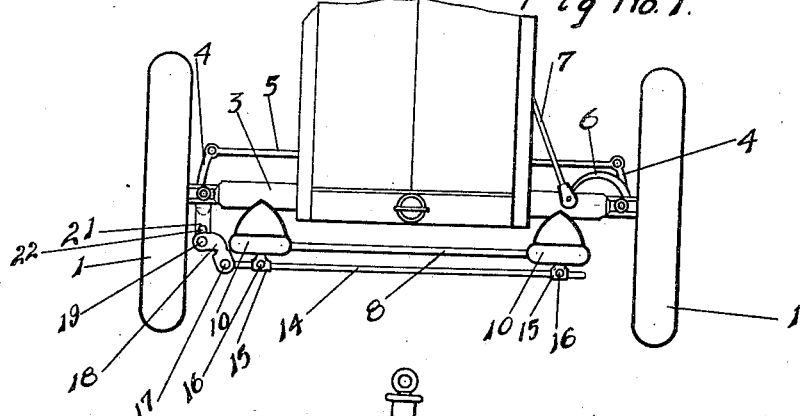
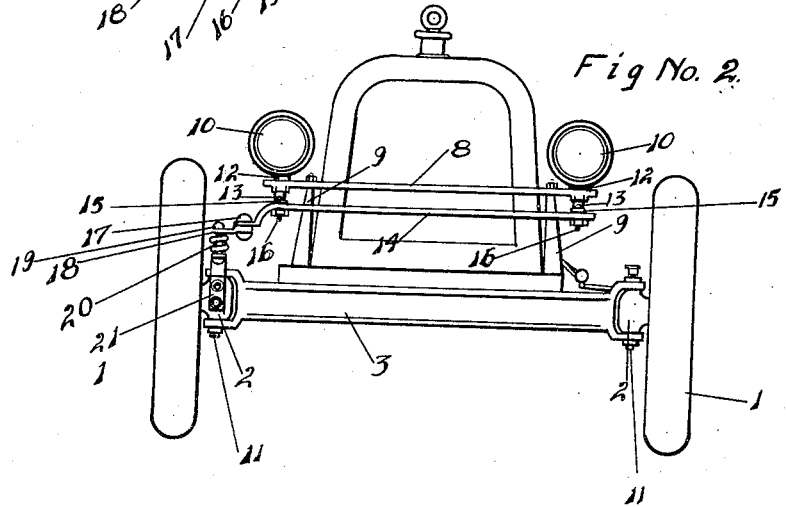
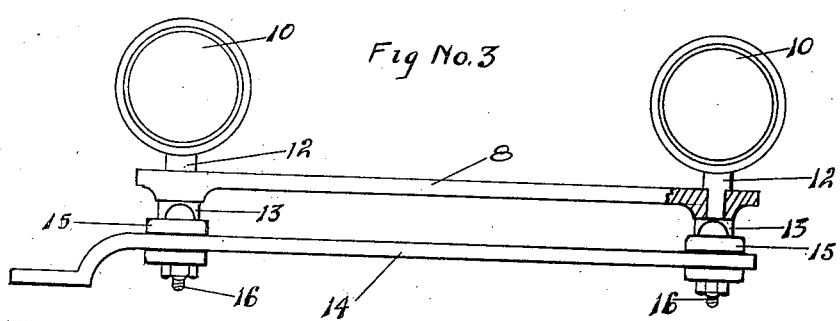
WITNESSES:
INVENTOR
Alfred Hamel.
BY
Thomas Bilyeu
ATTORNEY Patented Mar. 27, 1923.

1,450,036

UNITED STATES PATENT OFFICE.

ALFRED HAMEL, OF PORTLAND, OREGON.

HEADLIGHT CONTROL FOR USE ON AUTOMOBILES.

Application filed January 6, 1922. Serial No. 527,365.

*To all whom it may concern:*

Be it known that I, ALFRED HAMEL, a citizen of the United States, residing at Portland, Route No. 2, in the county of Washington, State of Oregon, have invented a new and useful Improvement in a Headlight Control for Use on Automobiles.

The general accepted practice on automobiles in use today is to have the headlights secured directly to the frame of the automobile or to other parts thereof in such rigid manner that the beam from the headlight is projected approximately parallel with the line of travel of the machine, so much so, that when a curve in the road is reached the beam from the heat-light does not follow the curvature but is projected along the line of original travel. My invention provides an adjustable means controlled by the operator wherein the light beam follows approximately the curvature encountered by the motorist, because the adjustable control is directly fastened or secured to the front axle knuckle through a series of levers to the shank of the head-lights, therefore, as the automobile is steered along the path of travel by the driver the beams of light from the head-light are projected along the road pathway.

I attain these objects by the mechanism illustrated in the accompanying drawings in which—

Figure 1 is plan view of the mechanism shown attached to the head-lights of an automobile. Fig. 2 is an end view of the same, while Fig. 3 is an enlarged partially cross-sectioned detached end view of the device.

Similar numerals refer to similar parts throughout the several views.

1 is the wheel of the machine. 2 is the front axle knuckle. 11 is the king bolt around which the front axle knuckle is pivoted. 3 is the front axle. 4 is the steering rods which are a part of the front axle knuckle. 5 is a distance rod connecting the same and 6 is the lever which is directly connected from the front axle knuckle to which it is directly attached or forms a part to the steering rod 7 which has a direct connection with the driver's steering wheel. 8 is a stationary bearing support attached to the body or frame of the automobile through brackets 9. 10 is the head-light. 12 is a bearing formed on the shank on the lower part of the headlight. 13 is a collar on the lower part of the shank and causes a working fit when properly adjusted between the bearing 12 and the bearing support 8. 14 is an adjustable lever connecting brackets 15 which are fastened rigidly to the shank of the head-light on their one end and are pivoted through bolt 16 to connecting rod 14 on the other end. Lever or link 18 is fastened or pivoted to lever 14 by means of bolt 17 on its one end and is pivoted on its other end through bolt 19, which is held in position by means of compression spring 20. 21 is a bracket that is rigidly and securely fastened to the forward end of the front axle knuckle and through which bolt 19 passes and upon the upper side of which compression spring 20 is saddled, thus it will be seen that as the steering mechanism is operated by the driver of the automobile, front axle knuckle 2 is partially rotated around king bolt 11 which imparts this movement through bracket 21 and link 18 and connecting rod 14 through link 15 to head-lights 10, thereby creating a movement to the headlights directly proportionable to that imparted to the front axle knuckle. By making a slot 22 in bracket 21 through which bolt 19 passes, a desired adjustment may be made whereby the proper movement may be imparted to the head-lights.

Having thus described my invention I wish to make the following claim therefor:

In a dirigible headlight for automobiles, a rigidly mounted bar, a headlight having a depending spindle journaled in each end of the bar, a lever fixed at one end to the lower end of each headlight spindle, a rod to which the free ends of the levers are pivoted, a bracket rigidly connected to a steering knuckle of the automobile and projecting forwardly thereof, a link connected to the end of the rod with the free end thereof disposed above the free end of the bracket, a pin pivotally connecting the bracket to the link, and a coil spring enclosing the pin between the rod and link.

ALFRED HAMEL.